June 20, 1967   J. A. DORR ET AL   3,327,286

TRANSDUCER

Filed Oct. 22, 1965

WITNESSES
Wm. B. Sellers.
James F. Young.

INVENTORS
John A. Dorr and
Phillip R. Anderson
BY Dean Schron
ATTORNEY

United States Patent Office

3,327,286
Patented June 20, 1967

3,327,286
TRANSDUCER
John A. Dorr, Baltimore, and Phillip R. Anderson, Ellicott City, Md., assignors to Westinghouse Electric Corporation, Pittsburgh, Pa., a corporation of Pennsylvania
Filed Oct. 22, 1965, Ser. No. 502,214
2 Claims. (Cl. 340—8)

This invention in general relates to transducers, and more particularly to underwater narrow beam transducers particularly well adapted for distance measuring.

In oceanographic studies it is often desired to measure wave heights for obtaining in indication of sea direction, sea state, or to obtain a general indication of the sea for energy and frequency distribution studies. Methods of obtaining wave information include the use of wave staffs which extend above the surface of the water from a point below the surface with suitable equipment for either recording or observing the wave. Another method is to measure pressure at a point below the surface and then predict or compute what the sea above the point looks like from the pressure information obtained. These two methods, however, are only suited for use in relatively shallow water and do not always provide exacting information. In addition, wave staffs often interfere with water motion and are affeced by severe wave forces.

Another method for observing the sea utilizes ultrasonic measuring equipment located below the sea surface to project a beam of acoustic energy toward the sea surface and detect the acoustic return signal therefrom. Knowing the speed of sound in sea water, the height of the sea above the equipment may then be calculated once the round trip time is known. The acoustic beam provided by the transducers utilized in the equipment has a finite beam spread of a size which tends to impinge upon a relatively large area of the sea surface to thereby degrade, to some extent, any information obtained.

It is, therefore, a primary object to provide an improved transducer for use in underwater distance measuring systems.

It is another object to provide an improved transducer which will project and receive a narrower beam of acoustic energy than transducers of the prior art.

A further object is to provide an improved transducer which will project and receive a narrow beam of acoustic energy toward the sea surface from a point hundreds of feet below the sea surface yet still maintain reasonable resolution.

A further object is to provide an improved transducer which is capable of measuring high frequency sea waves.

Another object is to provide an improved transducer capable of measuring wave height with a smaller error than those transducers of the prior art.

Briefly, in accordance with the above objects, there is provided a transducer unit having two concentric ring transducer active elements each being of the type which is focused along a central axis with the configuration being such that each active element has the same central axis. One of the active elements is used as a transmitter of acoustic energy (projector) and the other active element is used as the receiver (hydrophone) for return acoustic signals. The ratio of the diameters of the ring transducer active elements are preferably in the order of 2:3.

The above stated as well as further objects and advantages of the present invention will become apparent upon a reading of the following detailed specification taken in conjunction with the drawings in which.

Figure 1:
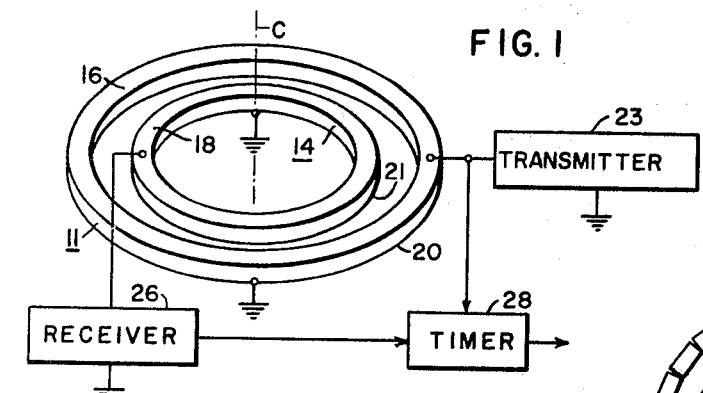
FIGURE 1 illustrates a perspective view of the active elements utilized in the present invention.

Referring now to FIG. 1, there is shown two ring transducer active elements 11 and 14 each having a front or top radiating surface 16 and 18 respectively, and each having a rear surface 20 and 21 respectively, which may be suitably backed by a pressure release material, as is well known to those skilled in the art. Alternatively, for extremely deep water use the active elements may be backed by a sound absorbing rubber material as described and claimed in copending application Ser. No. 379,111, filed June 30, 1964, by F. G. Geil, R. H. Whittaker and J. H. Thompson, and assigned to the assignee of the present invention.

The active elements and backing may be set into a transducer housing (not shown) and acoustically coupled to the surrounding water medium through a castor oil retained by a $\rho c$ rubber face that is clamped to the transducer housing. The castor oil and $\rho c$ rubber are well known and are utilized in transducer design since they have approximately the same acoustic transmission characteristics as sea water.

Ring type active elements such as illustrated in FIG. 1 are well known in the art. The ring type active element produces an extremely narrow acoustic beam which is focused along a central axis. In FIG. 1 both of the active elements 11 and 14 have substantially the same central axis C. In the present invention two ring type active elements 11 and 14 are concentrically arranged with the same central axis for transmitting and receiving acoustic energy.

In operation, transmitter means 23 provides an electrical signal to one of the ring type active elements such as element 11 whereupon a narrow beam acoustic signal will be projected toward a target such as the sea surface. At this time the receiver means 26 connected to the other ring type active element 14 may be made inactive. The return acoustic signal reflected from the target is then detected by the active element 14, is converted into an electrical signal and detected by the receiver means 26. In order to provide an indication of target distance timer means 28 which may be a digital counter is started upon a signal from the transmitter means 23 and is stopped upon a signal from the receiver means 26, with the final count in the counter representing the distance from the transducer to the target and back to the transducer. This information may then be processed in any well known manner for obtaining target distance. For optimal results in obtaining information from a relatively small portion of the target, the mean diameters of the two active elements 14 and 11 are preferably in the ratio of 2:3.

The transmitter means 23 is shown connected to the outer element 11 and the receiver means 26 to the inner element 14. The present invention will also operate with the transmitter and receiver means interchanged, however, the larger diameter active element 11 is used for transmitting since the larger active area thereof would provide somewhat more power.

Figure 2:
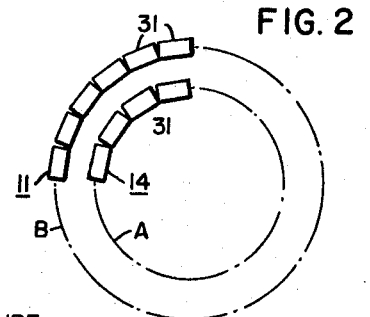
FIG. 2 illustrates a top view of a modified construction of the active elements.
Figure 2A:
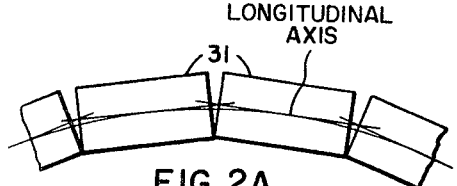
FIG. 2A illustrates a portion of FIG. 2 in more detail.

In FIG. 1 the rings 11 and 14 are each made up of a unitary piece of material such as a piezoelectric or a piezoceramic. FIG. 2 illustrates a modified construction wherein each transducer ring is made up of a plurality of short straight segments of active material such as piezoceramic, arranged end to end with the longitudinal axis of each straight segment being tangent to the same circle. This feature is illustrated in more detail in FIG. 2A. In FIG. 2 the inner elements 31 all lie on the smaller circle A and the outer elements 31 all lie on the larger circle B. The ratio of the diameter of circle A to the diameter of circle B is again preferably 2:3. For the arrangement of FIG. 2, circular bus bar means may be placed over the segments 31 for conducting electrical energy to the outer segments 31 and receiving the electrical signal from the inner segments 31.

Figure 3:
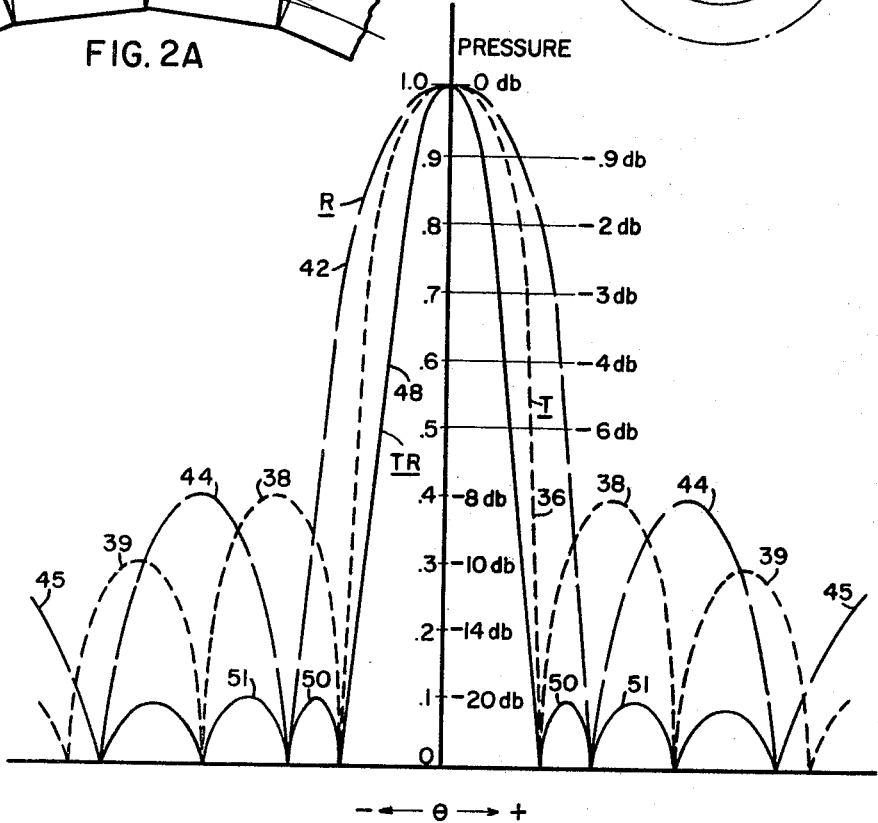
FIG. 3 illustrates curves demonstrating the improved operation of the present invention.

The operation of the concentric transmit and receive ring elements may be explained with reference to FIG. 3 illustrating typical beam patterns of the transmitter ring 11, the receive ring 14, and the combined unit. The graph of FIG. 3 illustrates beam pattern in rectangular coordinates; the horizontal axis $\theta$ represents the angular deviation from the line of focus (C of FIG. 1) and the vertical axis represents normalized acoustic sound pressure. That is, the maximum acoustic sound pressure has been given an arbitrary value of 1 with all sound pressures being relative to the maximum and therefore falling between zero and 1. The vertical scale of FIG. 3 has also been labeled —db (decibel). This designation is another manner of stating relative pressures and since the pressure falls between 0 and 1 the pressure designation will be —db or "db down." For example, the maximum point, 1.0 on the relative pressure scale would be equivalent to 0 db; a pressure of approximately 0.7 of maximum is said to be —3 db or 3 db down; and a pressure of approximately 0.1 is said to be —20 db or 20 db down. The db values are approximate and may be calculated exactly from the well known formula for obtaining db.

The curve labeled T, shown in dotted lines, represents the beam pattern for the larger diameter active element 11 constituting the transmitter. Curve T is seen to include a main lobe 36, first side lobes 38 having a maximum level of —8 db, and second side lobes 39 having a maximum level of —10 db. Other side lobes are present after the second side lobes but are not illustrated. The curve labeled R, shown in dashed lines, is the beam pattern for the smaller diameter receive active element 14. Curve R is seen to include a main lobe 42, first side lobes 44 having a maximum level of approximately —8 db, and the beginning of second side lobes 45. Higher order side lobes continue on to the left and right but are not illustrated.

The curves T and R are plotted according to the general equation for normalized pressure near the central axis of a ring type active element for ring diameters in the ratio of approximately 2:3. Actual figures used were 6.5 for the smaller diameter and 9.5 for the larger diameter ring thus giving a ratio of 0.685, which is considered herein to be in the order of 0.666 (a 2:3 ratio).

Curve TR, shown in solid line, is the resultant combined beam pattern of the concentric transmitter-receiver arrangement. In addition to main lobe 48, the combined curve TR includes a first side lobe 50, a second side lobe 51, and a plurality of continuing side lobes. The maximum side lobe level is in the order of —21 db and it is seen that the transducer is responsive to an extremely narrow acoustic beam. Side lobe rejection is greater than if a single ring element were utilized as both a transmitter and receiver.

In terms of beam width, the present invention is capable of providing a combined transmit receive beam width measured at the —3 db points of less than 0.1 degree. In terms of inches, this would be approximately a 2 inch diameter beam at 100 feet from the transducer. This combined transmit receive beam width allows for the measurement of high frequency waves as well as accurate measurements of other waves or targets. An actual transducer according to the teachings herein was fabricated according to FIG. 2. The active elements were a piezoceramic material (barium titanate) with the larger ring having a diameter of 14.7 inches and the smaller ring having a diameter of 9.7 inches resulting in a ratio of 0.66. The larger diameter ring was utilized as the transmitter and was operated at a frequency of 1320 kc. Acoustic energy was propagated toward a transducer probe at a distance of 30 feet from each of the concentric ring elements, and the composite TR curve of the transducer showed a beam width of 0.095° at the —3 db points and 0.179° at the —10 db points.

Although the present invention has been described with a certain degree of particularity, it should be understood that various modifications may be made in the light of the above teaching.

What is claimed is:
1. A transducer comprising:
   (A) a first ring transducer active element of the type which is focused along a central axis, for transmitting acoustic energy toward a target;
   (B) a second ring transducer active element of the type which is focused along a central axis, concentrically arranged with said first active element for receiving said acoustic energy reflected from said target; and
   (C) the ratio of the mean diameters of said ring transducer active elements being approximately 2:3.
2. A transducer according to claim 1 wherein
   (A) both of the active elements are made up of a plurality of short straight segments arranged end to end with the longitudinal axis of each segment being tangent to a respective circle; and wherein
   (B) the circles have diameters in the ratio of approximately 2:3.

References Cited

UNITED STATES PATENTS 3,177,382   5/1965   Green _____ 340—10 X

FOREIGN PATENTS 681,325   3/1964   Canada.

RONEY D. BENNETT, *Primary Examiner.*

CHESTER L. JUSTUS, *Examiner.*

B. L. RIBANDO, *Assistant Examiner.*